United States Patent [19]
Weber

[11] 3,844,206
[45] Oct. 29, 1974

[54] INFUSOR APPARATUS

[76] Inventor: Robert L. Weber, Box 217, New Canaan, Conn. 06840

[22] Filed: Jan. 17, 1972

[21] Appl. No.: 218,119

Related U.S. Application Data

[63] Continuation-in-part of Ser. No. 200,300, Nov. 19, 1971, Pat. No. 3,793,933.

[52] U.S. Cl. ...................... 99/282, 99/295, 99/300, 219/321, 219/330
[51] Int. Cl. ..................... A47j 31/30, A47j 31/06
[58] Field of Search ............. 99/280, 281, 282, 283, 99/292, 295, 300, 302 R, 71; 219/321, 328, 330, 333

[56] References Cited
UNITED STATES PATENTS

| | | | |
|---|---|---|---|
| 2,394,747 | 2/1946 | Campbell | 99/281 |
| 2,538,080 | 1/1951 | Bolesky | 219/330 |
| 3,423,209 | 1/1969 | Weber | 99/302 R |
| 3,431,395 | 3/1969 | McClure | 219/330 |
| 3,592,125 | 7/1971 | Tolmie | 99/295 |
| 3,715,567 | 2/1973 | Mandziak | 219/328 |
| R25,663 | 10/1964 | Bunn | 99/283 |

FOREIGN PATENTS OR APPLICATIONS

| | | | |
|---|---|---|---|
| 1,004,528 | 1965 | Great Britain | 219/330 |

*Primary Examiner*—John W. Huckert
*Assistant Examiner*—Stuart S. Levy
*Attorney, Agent, or Firm*—Lester W. Clark; Christopher C. Dunham

[57] ABSTRACT

This infusor apparatus is particularly intended for making coffee, tea or the like, and is particularly adapted for preparing a fixed quantity of coffee, e.g., a single cup. The apparatus includes a heating chamber having a filter therein for treating the incoming water. This chamber is closable by a cover having pressure regulating and pressure relief valves supported therein. Two electric heaters are provided at the bottom of the heating chamber. Their operation is initiated by a manual switch. When the water temperature reaches the proper brewing temperature, a bimetallic disc snaps, opening a valve to allow the water to discharge into an infusion chamber, and at the same time operating a switch to deenergize one of the two heaters. The water discharges from the heating chamber under the pressure of the vapor which has developed during the heating. The second heater is located substantially at the level of the heating chamber outlet, so that as the water is forced down by the vapor pressure to that level, the heat is concentrated in a decreasing volume of water and the water pressure is raised for a few seconds until the water falls below that level and a discharge of vapor takes place into the infusion chamber. This vapor flow is effective to force the water absorbed in the coffee out of the infusion chamber and into a coffee receiving receptacle. The second heater is turned off by a thermostatic switch mounted on the heater itself, and set to cut off the energy to that heater when the heater exceeds a predetermined temperature, which is encountered when the water level falls below the outlet.

The coffee is contained in a cartridge comprising a paper cylinder with filter paper covering its ends. Screens below and above the ends of the cartirdge support and protect the filter paper during the infusion operation.

The inlet filter is in a casing having a flange supported on a plurality of lugs projecting inwardly from the periphery of the heating chamber. The diameter of the inlet filter flange is shorter than the diameter of the heating chamber, so that a vapor vent is provided around substantially the entire periphery of the filter casing.

25 Claims, 19 Drawing Figures

PATENTED OCT 29 1974 3,844,206

INFUSOR APPARATUS

CROSS-REFERENCE

This application is a continuation-in-part of my co-pending application Ser. No. 200,300, filed Nov. 19, 1971, now U.S. Pat. No. 3,793,933, entitled "Coffee Infusion Apparatus and Method."

SUMMARY OF THE INVENTION

The infusor apparatus disclosed comprises a sealable heating chamber where water is heated to a predetermined temperature and an infusion chamber adapted to receive a measured quantity of coffee, and into which the heated water is introduced.

The heating chamber has a combined pressure regulating and pressure relief valve mechanism housed within the cover of the chamber. Two electric heaters heat the water in the chamber. A master control switch may be turned on manually and is then effective to energize both of the heaters. A bimetallic disc thermostat responsive to the temperature of the water in the chamber, and protected from contact with the water, snaps open a discharge valve for the heating chamber when a predetermined water temperature is reached. It also opens a switch in series with one of the two heaters.

The pressure regulating valve mechanism allows the build up of vapor pressure within the heating chamber during the heating cycle to a predetermined level, and then maintains the pressure in the heating chamber at a substantially constant value just prior to the opening of the discharge valve. After the discharge valve for the heating chamber is opened by the metallic disc, there is a partial drop in pressure within the heating chamber. The remaining heater is effective to maintain the supply of heat to the chamber sufficient to hold the pressure therein at substantially the value determined by the pressure regulating valve. Hence, the discharge from the chamber takes place at a substantially constant pressure and therefore within a substantially constant period of time. As the water level in the chamber falls during discharge of the water, the pressure in the chamber remains substantially constant until the water level approaches the outlet of the chamber, which is at substantially the same level as the second heater. This heater is continuing to supply heat at a substantially constant rate to a decreasing volume of water so that the vapor production in the heating chamber rapidly increases at this time, increasing the pressure in the heating chamber and forcing the remaining water out through the outlet and into the infusion chamber, followed by a discharge of vapor which forces the residue water in the infusion chamber through the bed of coffee into a receptacle for the infusion.

The second heater is turned off by a thermostat mounted on the heater itself, and effective when a predetermined heater temperature is exceeded to open the master switch and reset it to its off position.

The thermostat mounted on the heater is also effective as a safety control to prevent overheating of the heater by operation of the push button at a time when there is no water in the heating chamber. If the push button is actuated at such a time, this thermostat is heated rapidly and actuates the master switch back to its off position before the heaters have time to overheat the apparatus.

The coffee may be contained in a cartridge comprising a paper cylinder with filter paper covering its ends. Screens in the apparatus below and above the ends of the cartridge support the filter paper and aid it in confining the coffee grounds during the infusion operation.

An inlet filter is provided in the heating chamber comprising a cylindrical filter casing having a lower section of relatively small diameter connected at its upper end to a section of relatively large diameter. That upper section has an outwardly projecting flange at its upper end. When the receptacle is placed in the heating chamber, the flange rests on a plurality of spaced, inwardly projecting lugs located around the periphery of the heating chamber, so as to provide clearance between the rim of the upper flange and the heating chamber wall. This clearance provides a vapor vent around the filter, so that vapor generated during the heating of water can escape through the pressure regulating and pressure relief valves.

DETAILED DESCRIPTION

According to the Coffee Brewing Center, some of the variables which affect the flavor and quality of coffee are:

1. the time of contact between the water and the coffee;
2. the water temperature during contact;
3. the water composition;
4. the coffee-to-water ratio.

The apparatus of the present invention is designed to hold these factors all constant as far as possible. To emphasize that purpose, the invention is described herein as applied to a fixed batch coffee maker, i.e., a single cup coffee maker. While certain features of the invention may be used in a variable batch coffee maker, nevertheless under those circumstances certain of the factors mentioned above are no longer controlled by the apparatus but are subject to the will of the operator of the apparatus. For example, the coffee-to-water ratio is then strictly under the control of the operator. Also, the time of contact between the water and the coffee tends to vary with the quantity of water employed, which in turn affects the heating time. The time of coffee-water contact may be maintained constant in a variable quantity coffee maker only by making adjustments to the capacity of the infusion chamber, the quantity of water selected and at the same time the heat input rates. Unless those adjustments are made properly, the quality of the coffee product will be adversely affected.

FIGS. 1-5

These figures illustrate the principal features of an infusor constructed in accordance with the invention. The infusor illustrated is intended to make a fixed quantity, specifically, a single cup of coffee at each operation of the infusor. Infusors in accordance with the invention may alternatively be designed for batches of other sizes, e.g., two, four or six cups, by simply changing the capacities of the heating and impression chambers, and the rate of heat output of the heaters. The infusion time of the coffee is not affected if such changes are properly coordinated. To make a variable capacity infusor, the infusion chamber capacity must be made variable, and the rate of heat output must also be coordinated, as taught, for example, in my copending application Ser. No. 200,300, filed Nov. 19, 1971 now U.S. Pat. No. 3,793,933.

The infusor comprises a base 1 on which is integrally formed a heating chamber 2. The top of the heating chamber has a recessed peripheral shelf 2a, on which is fixedly supported a ring 3 carrying a projecting bridge 3a. At the end of the projecting bridge 3a, on the under side thereof, there is formed a cover 4 for an infusion chamber 5. The infusion chamber 5 is supported on the cover 4, as by thread or bayonet type coupling, and is supported over a receptacle 6 received in a recess 1a in the base 1.

Figure 5:
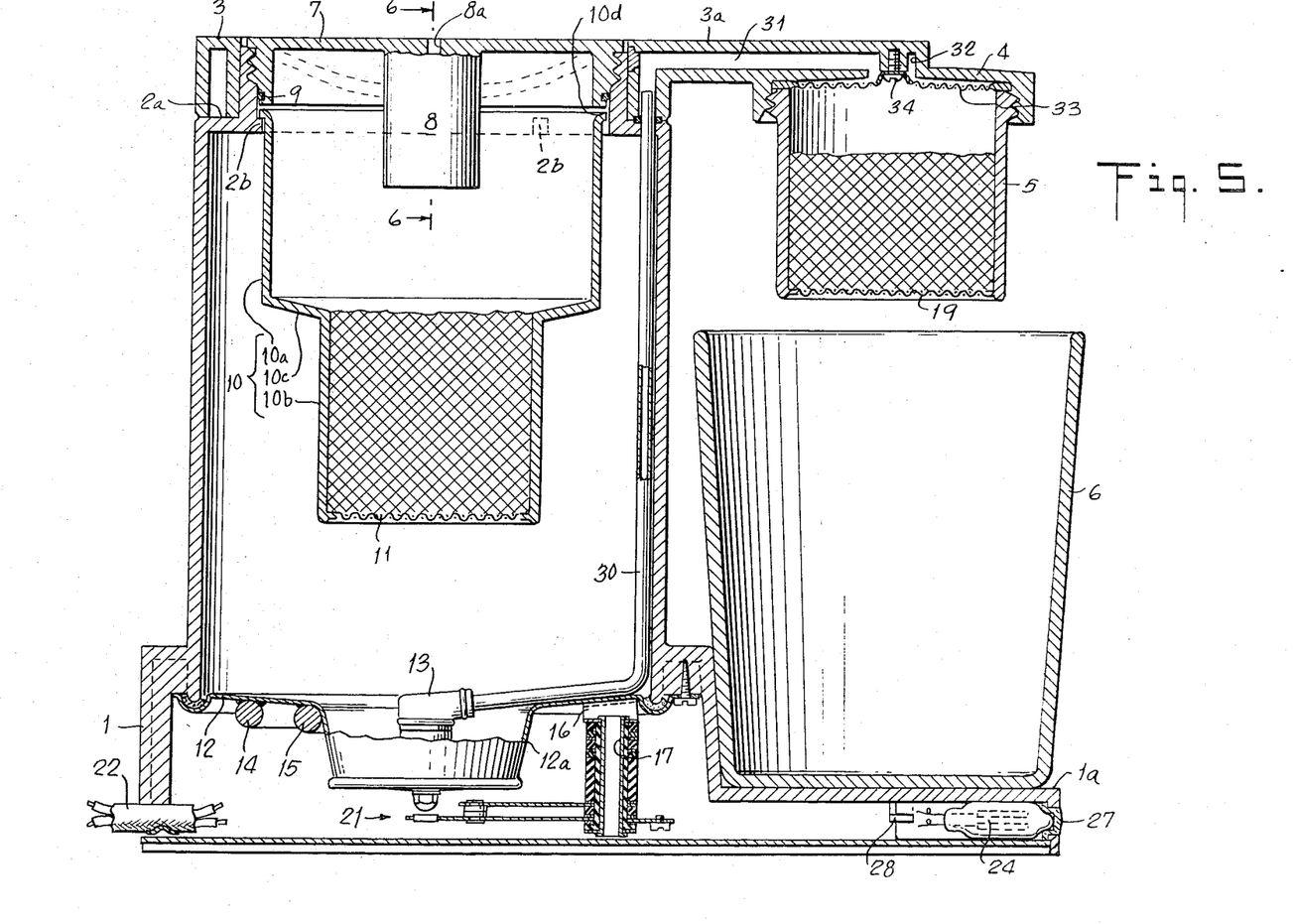
FIG. 5 is a sectional view taken on the line 5—5 of FIG. 1.
Figure 6:
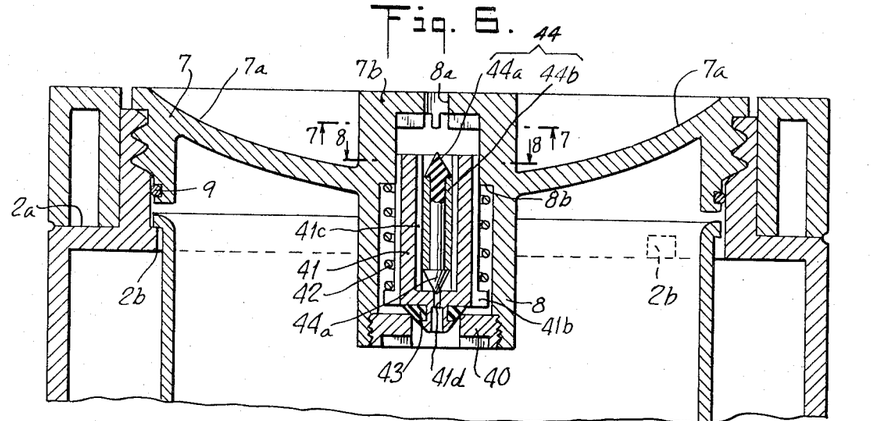
FIG. 6 is a sectional view taken on the line 6—6 of FIG. 5.
Figure 7:
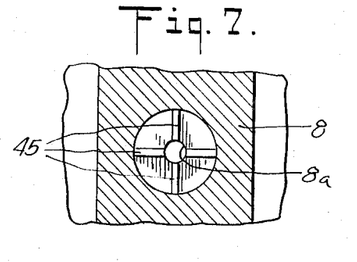
FIG. 7 is a sectional view taken on the line 7—7 of FIG. 6.
Figure 8:
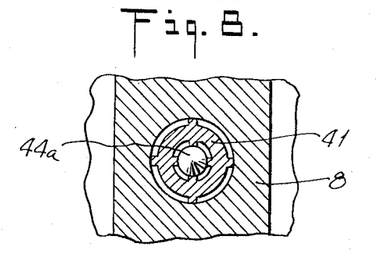
FIG. 8 is a sectional view taken on the line 8—8 of FIG. 6.

A removable cover 7 is provided for the heating chamber 2. The cover 7 has two generally semicircular recesses 7a (FIG. 6), separated by a diametrical ridge 7b which facilitates the application of a rotating torque to the cover 7. At the center of the ridge 7b, on the under side thereof, there is provided an integral valve housing 8 having a vent 8a in the middle of its upper end. The valve housing and the valves enclosed therein are described more completely below in connection with FIGS. 6-9.

The outer periphery of the cover 7 is threaded, and is received in a mating thread on the inside of the upper end of the heating chamber 2.

The periphery of the cover 7 is provided, below the external threads, with a recess to receive an O-ring seal 9, so that when the cover is in place, the chamber 2 is tightly closed at its upper end, except that it may be opened by the valves within the housing 8.

On the inner periphery of the shelf 2a, there are provided a plurality of integrally molded inwardly projecting lugs 2b.

A filter casing 10 having an upper large diameter portion 10a and a lower small diameter portion 10b is located within the heating chamber 2. The upper portion 10a is connected to the lower portion 10b by an integral conical portion 10c. The lower portion 10b contains one or more beds of filter material for filtering water which is poured into the upper portion 10b. The filter material may be activated charcoal for removing various impurities including chlorine and fluorine ions, both of which are commonly present in drinking water as additives and which have a deleterious effect on the taste of coffee made with the water. Alternatively, or additionally, the filter may contain an ion exchange material for removing calcium and magnesium ions and substituting sodium ions to prevent the build up of calcium carbonate or magnesium carbonate on the inner surface of the chamber 2.

The filter material could have a phosphate added to further inhibit deposit of calcium carbonate or the like on the heat exchange surfaces of the heating chamber. The specific filter material employed is not part of the present invention. However, the specific filter supporting structure, its location, and the fact that it can be readily replaced, are features of the present invention. The filter material may be enclosed in a cartridge, generally similar to the one described below in connection with FIG. 16 to facilitate that replacement.

The lower end of the narrow diameter portion 10b of the filter casing 10 is closed by a screen 11, which supports the filter material.

It is intended that the wide diameter portion 10 a of the filter casing be sufficiently large to receive a full charge of water through the cover 7. The space within the heating chamber 2 below the filter chamber 10 is also sufficiently large to receive a full charge of water or other infusive liquid. The upper end of the wide diameter portion 10a is provided with an outwardly projecting flange 10d, which rests on the lugs 2b. The outside diameter of the flange 10d is smaller than the diameter of the adjacent wall of the heating chamber 2, so that between the lugs 2b, there is a continuous path for fluid communication between the interior of the chamber 2 and the inside of the filter casing 10.

The base 1 and the heating chamber 2 may be formed of molded plastic material, except that the bottom of the chamber 2 is closed by a metal plate 12 having a well 12a formed at its center. A discharge valve 13 is provided at the center of the well, as explained in detail below in connection with FIGS. 10 and 11. On the bottom of the plate 12, are mounted two concentric heating elements 14 and 15, inner heating element 15 being closely adjacent to the periphery of the well 12a. The operation of these heating elements is explained below in connection with FIGS. 12-14. The heating elements 14 and 15 are not complete circles, but have gaps at their right-hand ends, as clearly seen in FIG. 4.

Figures 9, 10, 11:
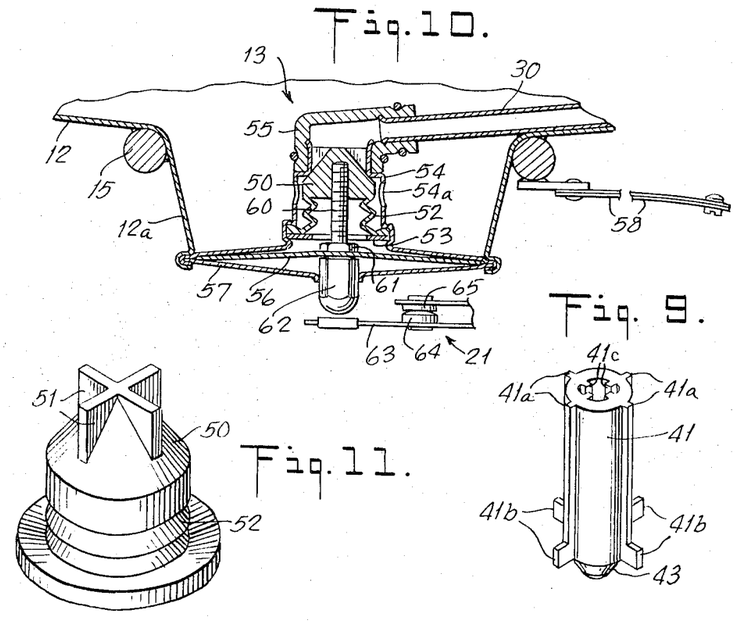
FIG. 9 is a perspective view showing the pressure relief valve.
FIG. 10 is a fragmentary sectional view taken on the line 10—10 of FIG. 4.
FIG. 11 is a perspective view, showing the discharge valve for the heating chamber.

A bracket 16 is spot welded to the bottom of the plate 12 and carries a downwardly projecting sleeve 17. The sleeve 17 supports a stack of insulators interspersed with terminals and other electrical elements including a master switch 20 shown in detail in FIGS. 12 and 13, and a thermostatic switch 21 whose operating mechanism is shown in FIGS. 5 and 10.

A power supply cable 22 extends into the left-hand side of the base 1, as it appears in FIGS. 1, 2, 4, and 5, and is attached to suitable terminals on the sleeve 17.

Figure 1:
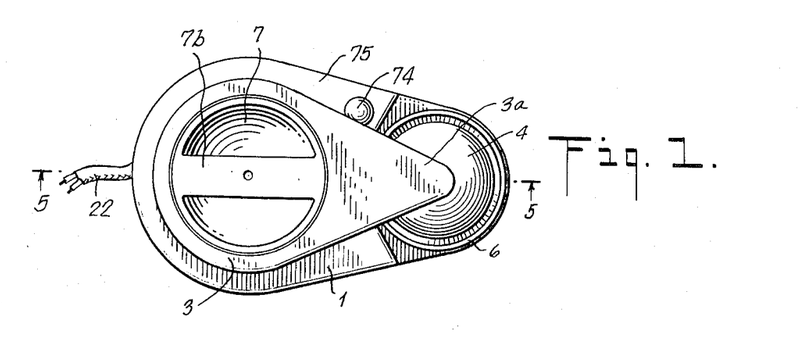
FIG. 1 is a plan view of an infusor apparatus embodying the invention.
Figure 2:
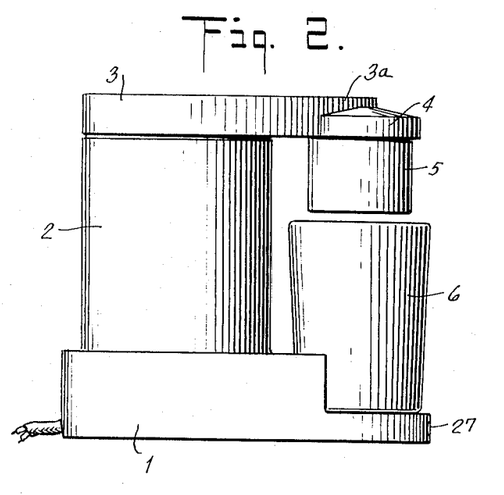
FIG. 2 is a side elevational view of the apparatus of FIG. 1.
Figure 3:
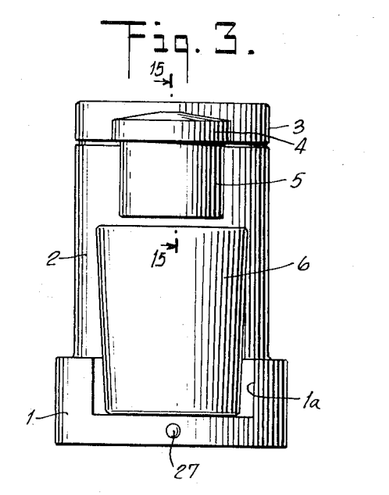
FIG. 3 is a front elevational view of the same apparatus.
Figure 4:
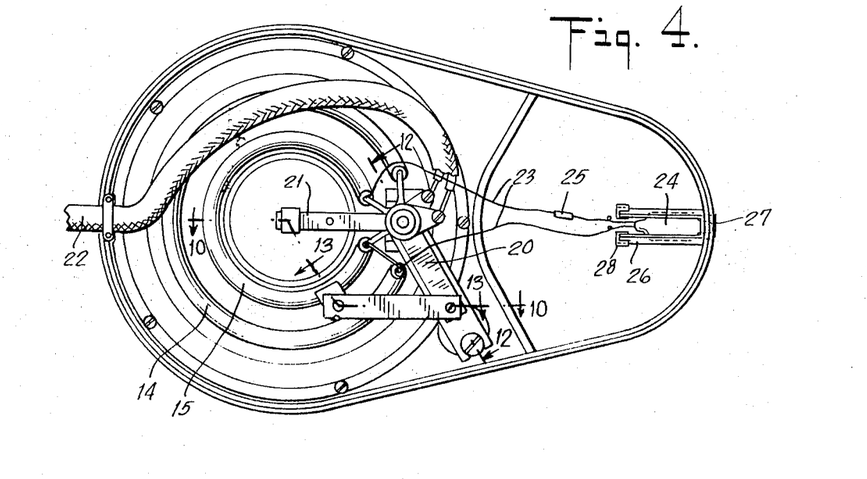
FIG. 4 is a bottom plan view of the apparatus of FIG. 1, with a bottom cover plate removed to show the electrical connections and arrangements of components.

Attached to the two terminals connected to the ends of the inner heater 15 are wires 23 leading to a neon lamp 24 and a series connected ballast resistance 25. The lamp 24 is retained by a flexible, light-transmitting, molded plastic yoke 26 having two cylindrically shaped arms extending along the sides of the lamp 24 and a connecting bight in which an integral lens 27 is formed. The ends of the arms of yoke 26 are slotted. These slots receive an arm of a pair of L-shaped brackets 28 (FIGS. 4 and 5). The lamp is assembled with the yoke by sliding it endwise between the arms of the yoke 26, which are then pinched together to allow insertion of lens 27 in a suitable aperture in base 2. The arms are simultaneously pressed down between brackets 28 and then released, thereby engaging their slots with brackets 28. The circuit for the lamp 24 is described below in connection with FIG. 14.

The valve 13 at the outlet of the heating chamber 2 delivers water through a conduit 30 which extends upwardly along the inside of the chamber 2 and into a passage 31 in the bridge 3a, which opens into an annular passage 32 formed in the cover 4. A spreader plate 33 is fastened by a screw 34 to the center post in the middle of the annular passage 32. The periphery of the spreader plate 33 is encapsulated in a sealing ring and is held between the top of the cylinder 5 and the cover 4 for the infusing chamber.

FIGS. 6–9

These figures show a combined pressure regulating and relief valve mechanism located in the housing 8 at the top of the heating chamber 2. The interior of housing 8 is generally cylindrical, being closed at the top except for the vent 8a and closed at the bottom by a valve seat disc 40. A hollow generally cylindrical valve member 41 (see FIG. 9) is located within the housing 8 and slides vertically therein. It is guided vertically by a plurality of ridges 41a formed in its outer surface. These ridges ride on the inside of the upper part of the cylindrical opening in the housing 8. A compression spring 42 is captured between a shoulder 8b formed in the housing 8 and a plurality of projections 41b formed at the lower ends of the ridges 41a. The spring 42 biases the relief valve member 41 toward closed position, in which position the valve seat 40 is engaged by a resilient insert 43 attached to the lower end of the valve member 41. The valve member 41 is closed at its lower end except for an orifice 41d at its center. The valve member 41 is open at the top. The inside of the valve member 41 is provided with a plurality of inwardly projecting ridges 41c on which a pressure regulating valve member 44 is vertically slidable. The valve member 44 has a cylindrical middle section and integrally molded conical end sections 44a of resilient material. A sleeve 44b, preferably of metal, encircles the middle section. The end sections 44a are of identical form, so that the valve 44 may be assembled in either vertical orientation.

The valve member 44 is biased by gravity so that its lower conical end closes the orifice 41d. It requires a predetermined pressure to lift the valve member 44 from its seat, depending upon the area of the orifice 41d and the weight of the valve member 44. The conical end portions 44a have their largest diameter the same as the diameter of the cylindrical middle section. When the valve is lifted from the orifice 41d. A substantial open area between the ridges 41c is available to provide fluid communication from the heating chamber 2 through the outlet vent 8a. The under side of the top surface of the housing 8 is provided with a plurality of ridges 45 which prevent the valve member 44 from closing completely the outlet vent 8a.

FIGS. 10–11

The discharge valve 13 comprises a valve member 50 which is attached to the upper end of a bellows 52. The lower end of bellows 52 is attached to a plate 53. Both the bellows 52 and plate 53 are fixed to the interior of a sleeve 54 having a plurality of peripherally spaced inlet openings 54a. The upper end of the sleeve 54 is rolled inwardly and is fitted inside the end of resilient fitting 55. A shoulder on sleeve 54 acts as a seat for valve member 50. A bimetallic disc having thermostatic properties has its periphery captured between the flared periphery of the sleeve 54 and a plate 57. The flared periphery of sleeve 54 and the plate 57 are rolled inside a flange formed on the lower end of sleeve 54. The lower end of sleeve 54 is flared outwardly and is attached as by seam rolling with appropriate sealing material to the lower end of the wall of well 12a.

The bimetallic disc 56 has a central aperture through which extends a threaded valve stem 60 having its upper end inserted into a threaded opening in the valve member 50. The stem 60 is anchored to the bimetallic disc 56 by a pair of nuts 61 and 62 so as to allow rotation, but little or no axial movement. The nut 62 under the disc 56 is elongated and extends downwardly below the plate 57 and is engageable with an electrically insulated switch finger 63 of switch 21. The switch finger 63 carries a movable contact 64 cooperating with a relatively stationary contact 65. The opposite ends of the switch fingers carrying contacts 64 and 65 are mounted on the sleeve 17, as may be seen from FIG. 4.

The upper end of the valve 50 is provided with a plurality of guide vanes 51 (FIG. 11) which slide within the valve seat and maintain the valve centered in all positions thereof.

The bimetallic disc 56 is selected to maintain the valve 50 closed until the temperature in the chamber 2 reaches a predetermined value. According to the Coffee Brewing Center of the Pan American Coffee Bureau, the optimum temperature for water for brewing coffee is 195° F.±5°. Since there is a certain temperature drop from the valve 50 through the conduit 30 into the brewing chamber 5, the valve 50 is set to open when the water temperature is about 200°, so as to compensate for that temperature drop. However, since the bimetallic disc 56 is not directly exposed to the water, because of the electrolytic corrosive effects which would result from such direct exposure, there is another time lag between the water temperature in the heating chamber 2 and the temperature of the bimetallic disc. The water temperature will typically be a few degrees higher than the temperature at the disc 56, since that disc is indirectly exposed to the temperature of the ambient air. Consequently, if the disc is set to open when it is about 195° F., the water temperature in the heating chamber will then be about 200° F., but in its passage from the heating chamber to the infusion chamber 5, there will be a temperature drop so that the water reaches the infusion chamber at the desired 195° F. When the valve 50 opens, it is opened with a snap action by the bimetallic disc 56. At the same time, the nut 62 is moved downwardly, engaging the switch finger 63 and separating the contacts 64 and 65 which control one of the heaters.

Figure 12:
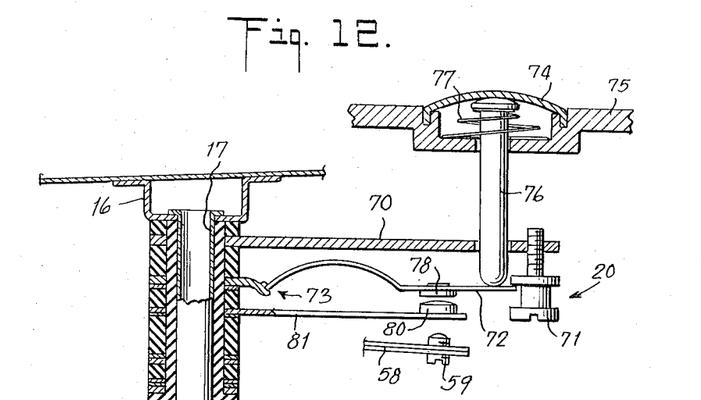
FIG. 12 is a sectional view taken on the line 12—12 of FIG. 4, showing the master switch.
Figures 13, 14:
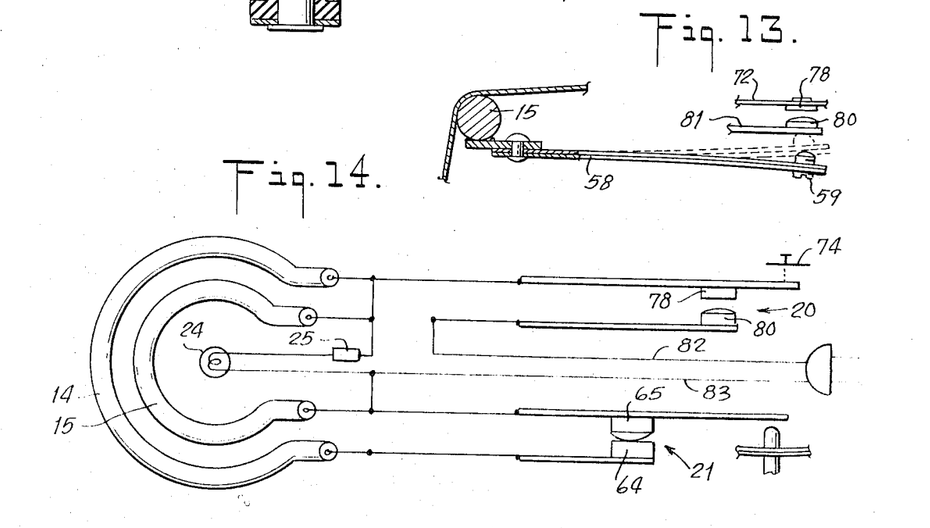
FIG. 13 is a sectional view taken on the line 13—13 of FIG. 4, showing the thermostat for operating the master switch to off position.
FIG. 14 is an electrical wiring diagram showing the heater, contro, power and indicator lamp circuits.

FIGS. 12–14

FIGS. 12 and 13 illustrate the operation of the master switch 20 which controls the infusor apparatus, and FIG. 14 illustrates the electrical circuit including that master switch 20, the switch 21 of FIG. 10 and the heaters 14 and 15.

As shown in FIG. 12, the sleeve 17 carries a rigid plate 70 which extends outwardly and threadedly carries at its tip a stop member 71 having two flanges between which moves the end of a switch finger 72 pivoted at 73 and also supported on the sleeve 17. A push button 74 is mounted in the top plate 75 of the base 1. The button 74 is preferably of flexible material and acts downwardly on a pin 76. A spring 77 is retained between the head of pin 76 and a flange on the top plate 75.

The switch finger 72 carries a contact 78 which cooperates with another contact 80 carried on a switch finger 81, also mounted on the sleeve 17. A bimetallic switch operating finger 58 is mounted in heat conductive relationship with the heater 15. The end of the finger 58 threadedly supports an insulated adjusting button 59 which is located under the end of the switch finger 81.

OPERATION

The operation of the infusor will be described in connection with the description of the electrical circuits shown in FIG. 14. In order to place the infusor in operation, a measured quantity of coffee is placed in the infusion chamber 5 The cover 7 is removed and a measured quantity of cold water is poured into the heating chamber 2. It is assumed that the filter casing 10 is in place, although the presence of the filter casing 10 is not absolutely necessary. The cover 7 is then replaced and the push button 74 is depressed, whereupon the switch finger 72 is moved over center so that its tip end is biased toward and engages the lower flange on the stop 71, thereby closing the contacts 78 and 80. This completes a circuit from one power supply line 82 (see FIG. 14) through contacts 80 and 78, thence through heaters 14 and 15 in parallel with lamp 24. The circuit from the inner heater 15 goes directly to the other power supply line 83, but the circuit for the outer heater 14 goes through the contacts 64 and 65.

The water in the heating chamber 2 then starts to heat and as it heats, the vapor pressure in that chamber increases. This vapor pressure is communicated around the periphery of the flange at the upper end of the filter casing 2. Whenever it exceeds a predetermined value, which may be, for example, 5 psi., the pressure regulating valve 44 lifts off its seat. This valve has a substantial difference between its opening and closing pressures. In other words, it will initially lift off its seat at about 75–80 ounces psi., and will remain floating or in vibrating contact with its seat until the pressure drops to about 55–60 psi. The particular pressure employed is not critical, as long as it is sufficiently greater than atmospheric pressure to lift the water from the heating chamber 2 up to the infusion chamber 5.

After the water in the heating chamber 2 reaches the temperature of about 200° F., the bimetallic disc 56 will snap to its lower position, opening the valve member 50 and opening the switch contacts 64–65, thereby terminating the supply of electrical energy to the outer heater 14. The inner heater 15 continues the operation and produces sufficient heat to maintain the vapor pressure in the chamber 2 great enough to force the heated water therein out through the valve 13 and up into the infusion chamber 5. That chamber is provided with a substantial excess volume above the volume required for the coffee. That volume now acts as a pressure accumulator, since the air trapped in chamber 5 above the wetted coffee grounds is compressed, and distributes the pressure evenly across the bed of coffee grounds and forces the water to flow down evenly through all parts of the coffee, without channeling. The process of emptying the heating chamber 2 and delivering the water to the infusion chamber 5 may take about 3–5 minutes. The capacity of the heater element 15 is designed to produce sufficient water vapor in the chamber 2 to maintain the pressure, thereby compensating for the loss of water from that chamber. As the water in the chamber 2 gets down to the level of the heater 15, there is less and less water being heated with the same amount of heat input, so that the water temperature in chamber 2 tends to rise toward the end of the infusion with a concurrent increase in vapor pressure. When the water gets below the openings 54a in the sleeve 54, then vapor rather than water is forced through the outlet conduit 30 and continues to flow through that conduit. At first, the vapor may be mixed with water, but as the water level continues to fall in the well 12 a, a point is reached where only vapor is flowing through the conduit 30. That vapor is effective to force most of the remaining water in the coffee in the infusion chamber 5 to move downwardly and out through the screen 19 at the bottom of that chamber. Energy is supplied to the heater 15 at a substantially constant rate. Energy is dissipated from the heater 15 at a rate which varies directly with the temperature of that heater and the heat conductivity of the material with which it is in heat conducting relationship. When the heater 15 is first energized, and the heating chamber 2 is full, the temperature of the heater 15 and hence the heat dissipation from it are at a low level. Because of the low heat dissipation, the temperature of the heater rises, increasing the heater dissipation until it reaches a value where the heat dissipated balances the heat input. The heat dissipation is largely through the plate 12 at the bottom of the chamber 2 and through the plate 12 at the bottom of the chamber 2 and through the liquid in the chamber. The heater remains at this balancing temperature as long as there is liquid in the chamber at the level of the heater. However, after the level of the liquid in the chamber drops below the heater 15, the heat transfer medium conducting heat away from the heater is vapor rather than water, and the vapor is a considerably less effective heat transfer medium that the water. The heater temperature therefore rises still further to a higher predetermined value in response to the dropping of the liquid level below the level of the heater 15. The thermostatic element 58 is set to operate at this increased temperature to move the button 59 into engagement with the switch finger 81, thereby forcing the fingers 81 and 72 upwardly and causing the finger 72 to snap back over the center and against the upper flange on the stop 71. This separates the contacts 78 and 80 and discontinues all flow of electrical energy to the heaters. The process is then complete.

Since, as pointed out above, the heater 15 is substantially at the same level as the heater outlet, the supply of heat is not terminated until the water drops below that level, thereby insuring that the infusor discharges a volume of liquid followed by a volume of vapor, and is thereafter stopped.

Note that if by accident the push button 74 is actuated with no water in the heating chamber, the heater 15 will quickly reach an excessive temperature, and will actuate the thermostat 58 to turn off the supply of electricity before any part of the infusor apparatus can become damaged by excess heat.

Figure 15:
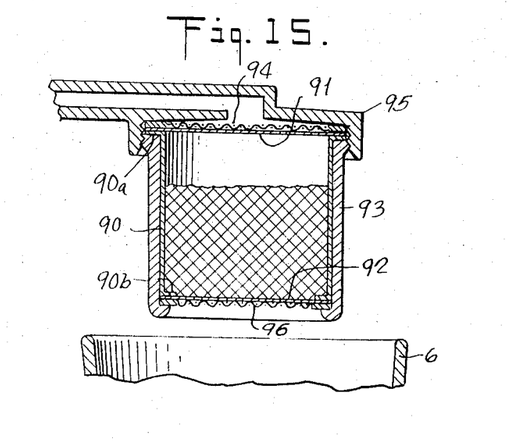
FIG. 15 is a fragmentary view taken along the line 15—15 of FIG. 3, on an enlarged scale.
Figure 16:
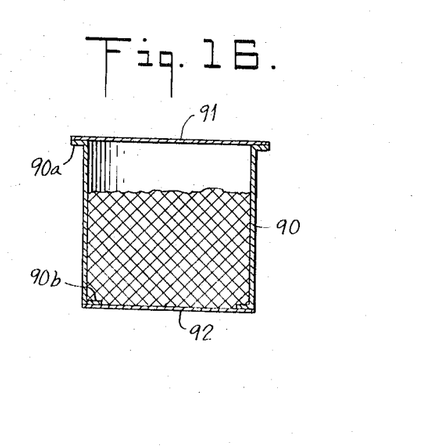
FIG. 16 is a cross-sectional view showing a coffee containing cartridge used in the infusion chamber of FIG. 15.

FIGS. 15–16

These figures illustrate a modified form of infusion chamber which may be used in place of the infusion chamber 5 of FIG. 5. In the infusion chamber of FIG. 15, the coffee is placed in a replaceable cartridge shown as comprising a cylinder 90 which may be impervious paper stock, with its ends closed by filter paper sheets 91 at the top and 92 at the bottom. A rigid cylinder 93 encloses the cartridge 90. A screen 94 covers the upper filter paper 91 when the cartridge is in place on the cover 95, which corresponds generally to the cover 44 of FIG. 5. Another screen 96 supported by the cylinder 93 supports the bottom of the cartridge when it is in place. The cartridge has an upper flange 90a which extends outwardly from the cylinder 90 and to which the filter paper 91 is attached, and a lower flange 90b extending inwardly from the cylinder 90 and to which the lower filter paper 92 is attached, as by sealing. The upper flange 90a serves as a seal between the outer rim of screen 94 and the cover 95 to prevent water from seeping between the threads of the cover and the cylinder 93. The diameter of the flange 90a should be slightly less than the minor diameter of the threads. The cartridge is filled about two-thirds full of coffee, giving the coffee an expansion and floating space equal to about half its own dry volume.

An individual cartridge, without the enclosing cylinder 93 and cover 95 is shown in FIG. 16.

Figures 17, 18, 19:
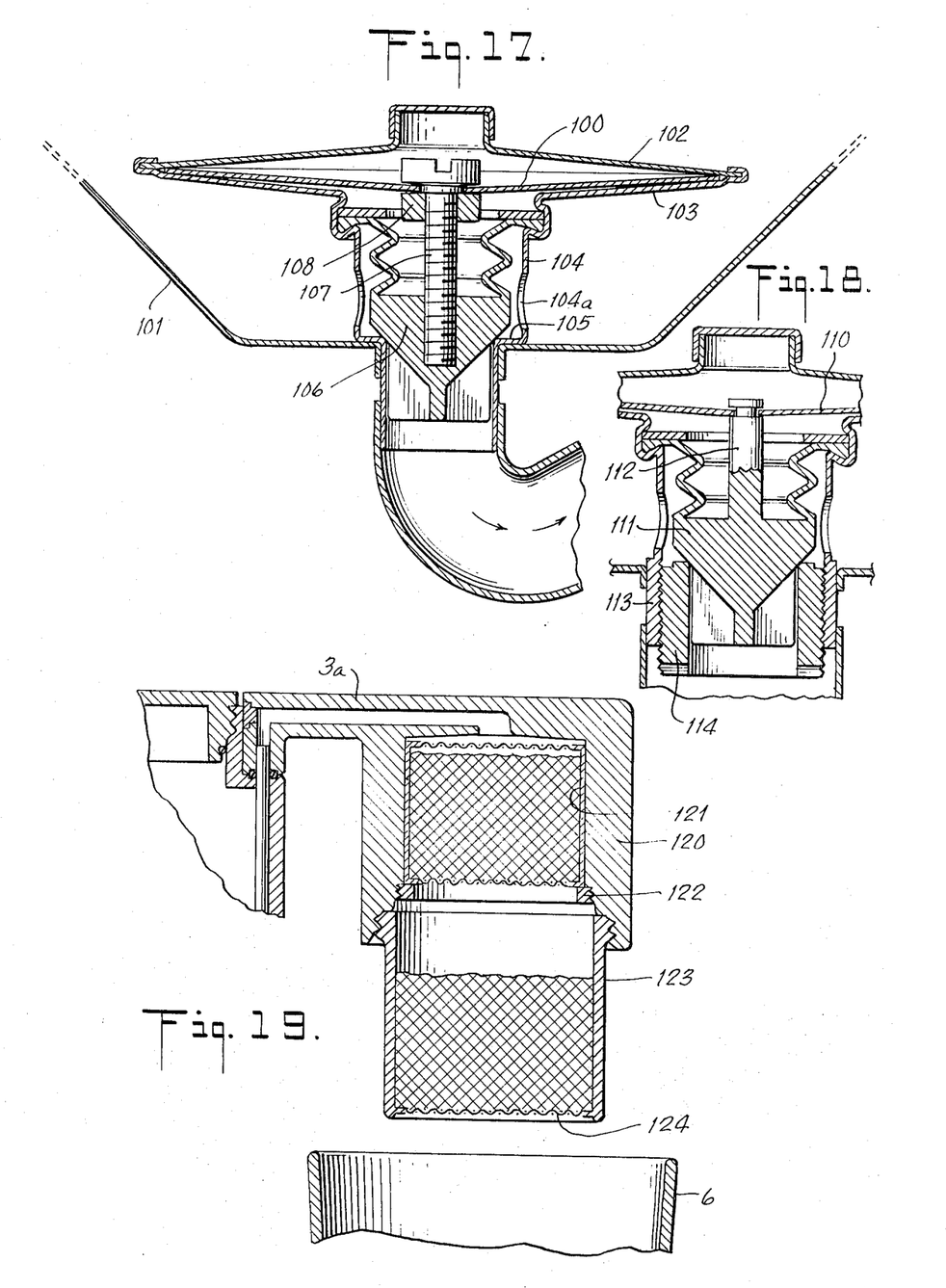
FIG. 17 is a view similar to FIG. 10, showing a modified form of outlet valve.
FIG. 18 is a view similar to FIG. 17, showing another modified form of outlet valve.
FIG. 19 is a view similar to FIG. 15, showing a modified form of filter apparatus.

FIG. 17

This figure illustrates a modified form of outlet valve structure which may be used in place of the outlet valve 13 of FIGS. 10 and 11. In the modification shown in FIG. 17, a bimetallic disc 100 is located inside a heating chamber 101, but is protected from the water in the heating chamber by means of an upper cover plate 102 and a lower cover plate 103. The edge of the cover plate 103 is rolled over the edge of the cover plate 102 to trap the edge to the bimetallic disc 100. The cover plate 103 is formed at its center into a downwardly depending sleeve 104 having inlet apertures 104a, and then has an inwardly projecting shoulder defining a seat 105 for a valve 106. The valve 106 is attached to the bimetallic disc 100 by a threaded stem 107. A nut 108 cooperating with the head of stem 107 serves to hold the bimetallic disc to the stem 107. The operation of valve shown in FIG. 17 is similar to that of the valve shown in FIG. 10. Separate mechanisms must be provided for operating the switch 21 if the valve of FIG. 17 is used. The valve of FIG. 17 has the advantage that its bimetallic disc 100 is completely within the heating chamber 2 and is more closely responsive to the heating chamber temperature, than in the case of the valve 13 of FIG. 10.

FIG. 18

This figure illustrates another modification of the outlet valve structure, including a different method of calibrating the temperature at which the valve is snapped open by the bimetallic disc. In this figure, a bimetallic disc 110 operates a valve 111, and the connection between them is through a stem 112 of fixed length, the stem 112 having a head rolled over the edge of an aperture in the disc 110 and holding that disc against a shoulder on the stem 112. The lower end of the encircling sleeve in threaded, as shown at 113 and the seat is threaded member shown at 114. By changing the position of the seat 114 with respect to the disc 110, the initial stress on the bimetallic disc may be changed with a consequent variation in the temperature to which it snaps the valve to open position.

FIG. 19

This figure illustrates a modification of the infusor apparatus of FIG. 5, in which the water is filtered after it is heated rather than before. The bridge 3a has an enlarged downwardly depending filter chamber 120 formed on its outer end. A filter cartridge 121 is received within that chamber and held in place by a threaded ring 122. An infusion chamber 123 is located below the filter chamber and has its upper end threaded to engage the lower end of the filter chamber 120. A screen 124 is provided at the lower end of the infusion chamber 123 to hold the coffee therein.

I claim:
1. An infusor, comprising:
   a. a chamber for receiving infusive material;
   b. a removable closure for the top of the chamber;
   c. an outlet valve at the bottom of the chamber;
   d. means for heating infusive material in the chamber;
   e. outlet valve operating means including a snap action bimetallic disc for opening the valve;
   f. a sealed chamber enclosing the disc and having a common wall with said material receiving chamber so that the disc temperature varies with the temperature of the water in the chamber and the disc snaps the valve open when the water exceeds a predetermined temperature;
   g. a valve stem connecting the center of the disc and the valve; and
   h. a bellows encircling the valve stem and attached at one end to the valve and at the other end to a fixed portion of said common wall, said bellows serving as another portion of the common wall.

2. An infusor as in claim 1, in which said valve stem is threadedly connected to the valve and is adjustable to vary the initial stress on the disc and hence its valve opening temperature.

3. An infusor as in claim 1, including:
a. an outlet conduit for said valve;
b. a seat for said valve at the entrance to said outlet conduit;
c. an inlet conduit for said valve comprising a tube encircling said valve and aligned with the valve seat, said tube having a plurality of peripheral apertures providing fluid communication between said valve and said heating chamber.

4. An infusor as in claim 3, including means for varying the position of the valve seat to vary the closed position of the valve with respect to the disc and thereby the initial stress on said disc and hence its valve opening temperature.

5. An infusor as in claim 3, in which said valve seat is located above the bottom wall of the heating chamber, and said valve is opened downwardly by said bimetallic disc.

6. An infusor as in claim 3, in which said valve seat is located substantially at the level of the bottom wall of said heating chamber, and said valve is open inwardly of the chamber by said bimetallic disc.

7. An infusor as in claim 6, in which said tube and said sealed chamber are located within the heating chamber.

8. An infusor, comprising:
a. a chamber for receiving infusive liquid;
b. means for heating infusive liquid in the chamber;
c. control means for said heating means, including:
  1. means for initiating the supply of energy to the heating means; and
  2. means responsive to the level of infusive liquid in the chamber for terminating the supply of energy to the heating means when the liquid therein is below a predetermined level;
d. said heating means comprises an electric heater at said predetermined level, said heater being subject to an increase in temperature above a predetermined value when the liquid level falls below the heater, due to the decreased heat dissipation from the heater;
e. said means responsive to the level of infusive liquid comprises means responsive to the heater temperature and effective when said temperature exceeds said predetermined value to deenergize said electric heater;
f. said means responsive to the heater temperature comprises:
  1. a bimetal member mounted in heat conductive relation with the heater and located outside the chamber;
  2. a movable switch contact operable by the bimetal member;
  3. a stationary contact cooperating with the contact on the bimetal member, said bimetal member being effective to separate the two contacts when the temperature of the heater exceeds said predetermined value.

9. An infusor, comprising:
a. a chamber for receiving a charge of infusive liquid;
b. an outlet valve having an inlet located adjacent but spaced above the bottom of the chamber;
c. means for heating the infusive liquid in the chamber;
d. outlet valve operating means responsive to the temperature of the liquid in the chamber for opening the valve when the temperature exceeds a predetermined value;
e. control means for said heating means, including means responsive to the level of the infusive liquid in the chamber to cut off the supply of energy to the heating means when the liquid falls to a level below that of the valve inlet opening, so that the infusor discharges a volume of liquid followed by a volume of vapor, and the supply of heat is thereafter stopped.

10. An infusor as in claim 9, in which said heating means comprises an electric heater extending horizontally at a level just above the valve inlet opening, and said level responsive means comprises a thermostatic switch in close heat conducting relationship with said heater.

11. An infusor, comprising:
a. a chamber for receiving a charge of liquid infusive material;
b. means for heating the liquid in said chamber; and
c. a combined pressure regulating valve and safety valve for said chamber, including:
  1. a valve housing having an outlet opening providing fluid communication between the interior of the housing and the atmosphere, and an inlet opening providing fluid communication between the chamber and the interior of the housing;
  2. a safety valve slidable within said housing;
  3. spring means biasing the safety valve against a seat surrounding the inlet opening;
  4. said safety valve being a hollow cylinder open at its upper end and closed at its lower end except for a second inlet opening;
  5. a pressure regulating valve slidable in said hollow cylinder and biased by gravity to close said second inlet opening, said hollow cylinder having at least one recess bypassing said regulating valve to allow passage of fluid from the chamber through said second inlet opening past the pressure regulating valve to the outlet opening.

12. An infusor as in claim 11, in which:
a. said outlet opening is aligned with said pressure regulating valve; and
b. said housing includes a limit stop for the pressure regulating valve adjacent the outlet opening and effective to prevent the pressure regulating valve from closing that opening.

13. An infusor as in claim 11, in which said pressure regulating valve comprises a cylinder with conical surfaces on both ends of the cylinder and coaxial therewith.

14. An infusor as in claim 13, in which the largest diameter of said conical surfaces is not greater than the diameter of said cylinder.

15. An infusor as in claim 11, including a removable cover for the top of said chamber, said valve housing being integral with said cover.

16. An infusor as in claim 15, in which:
a. said removable cover is threaded at its periphery and said chamber is provided with mating threads to receive said cover;
b. said cover has a generally concave upper surface with a diametrical ridge extending across said upper surface for applying a rotating torque to the cover; and c. said valve housing is within the ridge.

17. An infusor, comprising:
   a. a heating chamber for receiving a charge of infusive liquid;
   b. a removable cover for the top of said chamber;
   c. support means in said chamber below said cover;
   d. a filter casing receivable in the heating chamber on said support means, said filter casing and said support means being contoured to provide a space for fluid communication around the periphery of the filter casing; and
   e. filter means located at the bottom of said filter casing for filtering the incoming liquid before it is heated;
   f. said filter casing having a sufficient volumetric capacity above said filter means to receive a complete charge of infusive liquid;
   g. said heating chamber having a sufficient volumetric capacity below said filter casing to receive said complete charge of infusive liquid, said space allowing the air in said heating chamber to escape into the filter casing above the filter means as the infusive liquid flows through the filter means into the heating chamber.

18. An infusor as in claim 17, in which:
   a. the supporting means comprises a plurality of lugs extending inwardly from the chamber wall and circumferentially around the periphery of the opening closed by said cover; and
   b. said filter casing has an outwardly extending flange on its upper end having an outside diameter larger than the circle defined by the tips of said lugs and smaller than the inside diameter of the casing, so that when said filter casing is supported by engagement of said flange with said lugs, said space is provided between the flange and the chamber wall to allow said fluid communication.

19. An infusor as in claim 17, in which the filter casing has an upper portion of relatively large diameter so that its volumetric capacity is sufficient to receive the charge of infusive liquid, and a lower portion of relatively small diameter so that a predetermined depth of filter bed can be provided with a smaller volume of filter materials, said upper and lower portions being connected by a conical portion.

20. An infusor as in claim 17, including pressure regulating valve means carried by said cover for regulating the pressure in said heating chamber, fluid under said pressure being communicated to said valve means through said space.

21. An infusor, comprising:
   a. a cartridge containing material to be infused, said cartridge being adapted for insertion in an infusor, said cartridge including:
      1. a paper cylinder having flanges at its ends;
      2. first and second filter papers sealed to said end flanges and closing the ends of the cylinder;
      3. material to be infused in said cylinder having a volume less than about two-thirds of the cylinder volume;
   b. means for supplying a charge of infusive liquid under pressure;
   c. means for supporting the cartridge to receive the liquid charge at one end of the cylinder and to discharge the infusion from the other end of the cylinder;
   d. a screen attached to said supporting means and located close to the top filter paper when the cartridge is supported by the supporting means; and
   e. a second screen attached to the supporting means and underlying the bottom filter paper when the cartridge is supported by the supporting means.

22. An infusor, as in claim 21, in which said cartridge support means comprises a liquid impervious cylinder for enclosing the cartridge cylinder snugly, a screen fastened to the impervious cylinder and closing the bottom end thereof, said cylinder having an external thread at the upper end thereof, said liquid charge supplying means having a discharge outlet internally threaded to receive the upper end of said cylinder, and a filter screen within said outlet, said upper flange of the paper cylinder and the upper filter paper having diameters larger than the paper cylinder, so that said upper flange and upper filter paper extend between and are sealingly engaged by the rim of the filter screen and by the upper end of the liquid impervious cylinder.

23. An infusor, comprising:
   a. a chamber for receiving infusive liquid;
   b. means for heating infusive liquid in the chamber, comprising first and second heaters;
   c. control means for the heating means, comprising:
      1. means for initiating the operation of both the heaters simultaneously;
      2. first means for terminating the operation of the first heater when the liquid at the bottom of the chamber reaches a predetermined temperature; and
      3. second means for terminating the operation of the second heater when the liquid falls below a predetermined level.

24. An infusor, as in claim 23, in which:
   a. said heaters are electrically energizable;
   b. said initiating means is a snap switch manually movable from open to closed position;
   c. said first terminating means comprises a thermostat responsive to the temperature of the liquid at the bottom of the chamber;
   d. said second heater is located at a predetermined level and in heat transfer relation with the liquid; and
   e. said second terminating means comprises a second thermostat mounted on the second heater and effective when it reaches a predetermined temperature to open said snap switch.

25. An infusor as in claim 24, in which said second thermostat acts directly on said snap switch and terminates the operation of the second heater by restoring the snap switch to open position.

* * * * *